US010002416B2

(12) United States Patent
Mannar et al.

(10) Patent No.: US 10,002,416 B2
(45) Date of Patent: Jun. 19, 2018

(54) INVENTORY, GROWTH, AND RISK PREDICTION USING IMAGE PROCESSING

(71) Applicant: Accenture Global Services Limited, Dublin (IE)

(72) Inventors: Kamal Mannar, Singapore (SG); Senthil Ramani, Singapore (SG); Manik Bhandari, Singapore (SG); Andrea Huanhuan Wang, Singapore (SG); Uvaraj Balasundaram, Singapore (SG)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 46 days.

(21) Appl. No.: 15/146,342

(22) Filed: May 4, 2016

(65) Prior Publication Data
US 2017/0032509 A1 Feb. 2, 2017

(30) Foreign Application Priority Data

Jul. 31, 2015 (SG) .............................. 10201506012S

(51) Int. Cl.
*G06K 9/00* (2006.01)
*G06T 7/73* (2017.01)
(Continued)

(52) U.S. Cl.
CPC .......... *G06T 7/0002* (2013.01); *G06K 9/0061* (2013.01); *G06K 9/0063* (2013.01); *G06K 9/00577* (2013.01); *G06K 9/00791* (2013.01); *G06K 9/4642* (2013.01); *G06K 9/4652* (2013.01); *G06K 9/52* (2013.01);
(Continued)

(58) Field of Classification Search
CPC ............. G06K 9/00577; G06K 9/0061; G06K 9/0063; G06K 9/00791; G06K 9/4642; G06K 9/4652; G06K 9/52; G06K 9/6267; G06T 11/206; G06T 2207/20024; G06T 2207/20192; G06T 2207/30188;
(Continued)

(56) References Cited

U.S. PATENT DOCUMENTS

2011/0142351 A1* 6/2011 Chen ........................ G06T 5/004
382/199

OTHER PUBLICATIONS

Lina Tang and Guofan Shao, "Drone Remote Sensing for Forestry Research and Practices", Jun. 21, 2015, J. For. Res. 26(4): 791-797.*
Shridhar D. Jawak et al: "Validation of High-Density Airborne LiDAR-Based Feature Extraction Using Very High Resolution Optical Remote Sensing Data", Advances in Remote Sensing, vol. 02, No. 04, Dec. 31, 2013, pp. 297-311.
(Continued)

*Primary Examiner* — Siamak Harandi
(74) *Attorney, Agent, or Firm* — Mannava & Kang, P.C.

(57) ABSTRACT

According to examples, inventory, growth, and risk prediction using image processing may include receiving a plurality of images captured by a vehicle during movement of the vehicle along a vehicle path. The images may include a plurality of objects. The images may be pre-processed for feature extraction. A plurality of features of the objects may be extracted from the pre-processed images by using a combination of computer vision techniques. A parameter related to the objects may be determined from the extracted features. A spatial density model may be generated, based on the determined parameter and the extracted features, to provide a visual indication of density of distribution of the objects related to a portion of the images, and/or to provide an alert corresponding to the objects related to the portion of the images.

17 Claims, 12 Drawing Sheets

(51) Int. Cl.
- *G06T 7/00* (2017.01)
- *G06K 9/46* (2006.01)
- *G06K 9/52* (2006.01)
- *G06K 9/62* (2006.01)
- *G06T 5/00* (2006.01)
- *G06T 7/60* (2017.01)
- *G06T 11/20* (2006.01)
- *G06T 7/90* (2017.01)

(52) U.S. Cl.
CPC .............. *G06K 9/6267* (2013.01); *G06T 5/00* (2013.01); *G06T 7/60* (2013.01); *G06T 7/73* (2017.01); *G06T 7/90* (2017.01); *G06T 11/206* (2013.01); *G06T 2207/20024* (2013.01); *G06T 2207/20192* (2013.01); *G06T 2207/30188* (2013.01)

(58) Field of Classification Search
CPC ........... G06T 5/00; G06T 7/0002; G06T 7/60; G06T 7/73; G06T 7/90
See application file for complete search history.

(56) References Cited

OTHER PUBLICATIONS

Michael Shank: "Mapping Vegetation Change on a Reclaimed Surface Mine Using Quickbir", Journal American Society of Mining and Reclamation, vol. 2009, No. 1, Jun. 30, 2009, pp. 1227-1247.

Martin Karlson et al: "Tree Crown Mapping in Managed Woodlands (Parklands) of Semi-Arid West Aftrica Using WorldView-2 Imagery and Geographic Object Based Image Analysis", Sensors, vol. 14, No. 12, Nov. 28, 2014, pp. 22643-22669.

Salem Saleh Al-Amri et al: "Contrast Stretching Enhancement in Remote Sensing Image", International Journal of Computer Science Issues (IJCSI), Mar. 31, 2010, 4 pages.

Vincent L: "Morphological Grayscale Reconstruction in Image Analysis: Applications and Efficient Algorithms", IEEE Transactions on Image Processing, IEEE Service Center, Piscataway, NJ, US, vol. 2, No. 2, Apr. 30, 1993, pp. 176-201.

Yuan Wang et al: "Estimating rice chlorophyll content and leaf nitrogen concentration with a digital still color camera under natural light", Plant Methods, Biomed Central, London, GB, vol. 10, No. 1, Nov. 6, 2014, 11 pages.

* cited by examiner

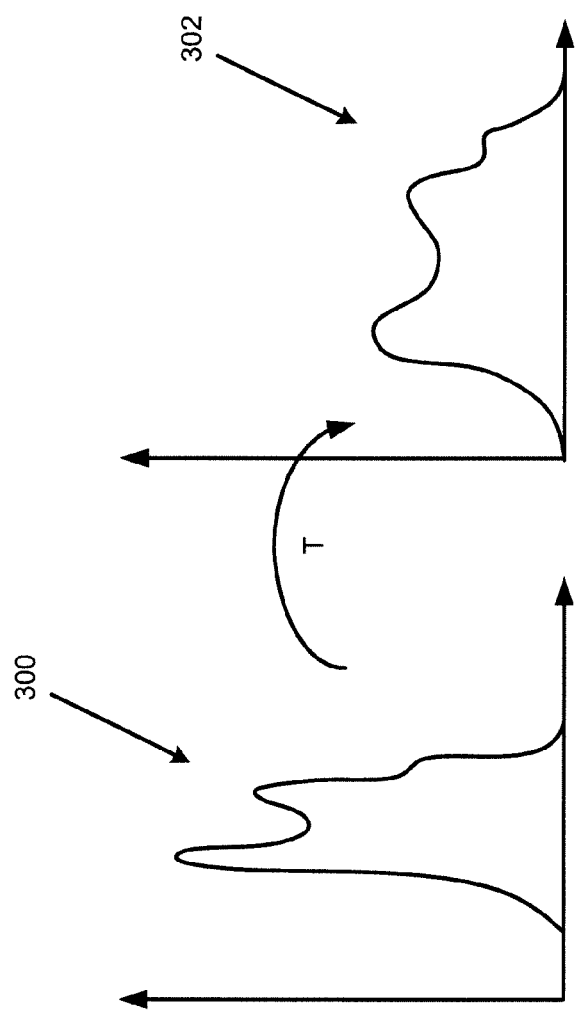

INVENTORY, GROWTH, AND RISK PREDICTION USING IMAGE PROCESSING

PRIORITY

The present application claims priority to Singaporean patent application number 10201506012S, having a filing date of Jul. 31, 2015, the disclosure of which is hereby incorporated by reference in its entirety.

BACKGROUND

Unmanned vehicles (UVs), which may include unmanned aerial vehicles (UAVs), drones, unmanned land vehicles, even collaborative robots, etc., are typically operated without a human aboard. Manned vehicles such as aircraft, helicopters, manned land vehicles, etc., are typically operated with a human aboard. Vehicles, including unmanned and manned vehicles, with imaging systems, such as video cameras, infrared (IR) sensors, etc., may be used to capture images of an area of interest. The images may be analyzed with respect to objects that are disposed in the area of interest.

BRIEF DESCRIPTION OF DRAWINGS

Features of the present disclosure are illustrated by way of examples shown in the following figures. In the following figures, like numerals indicate like elements, in which:

FIG. 3 illustrates histogram stretching for the inventory, growth, and risk prediction using image processing system of FIG. 1, according to an example of the present disclosure;

DETAILED DESCRIPTION

Figure 1:
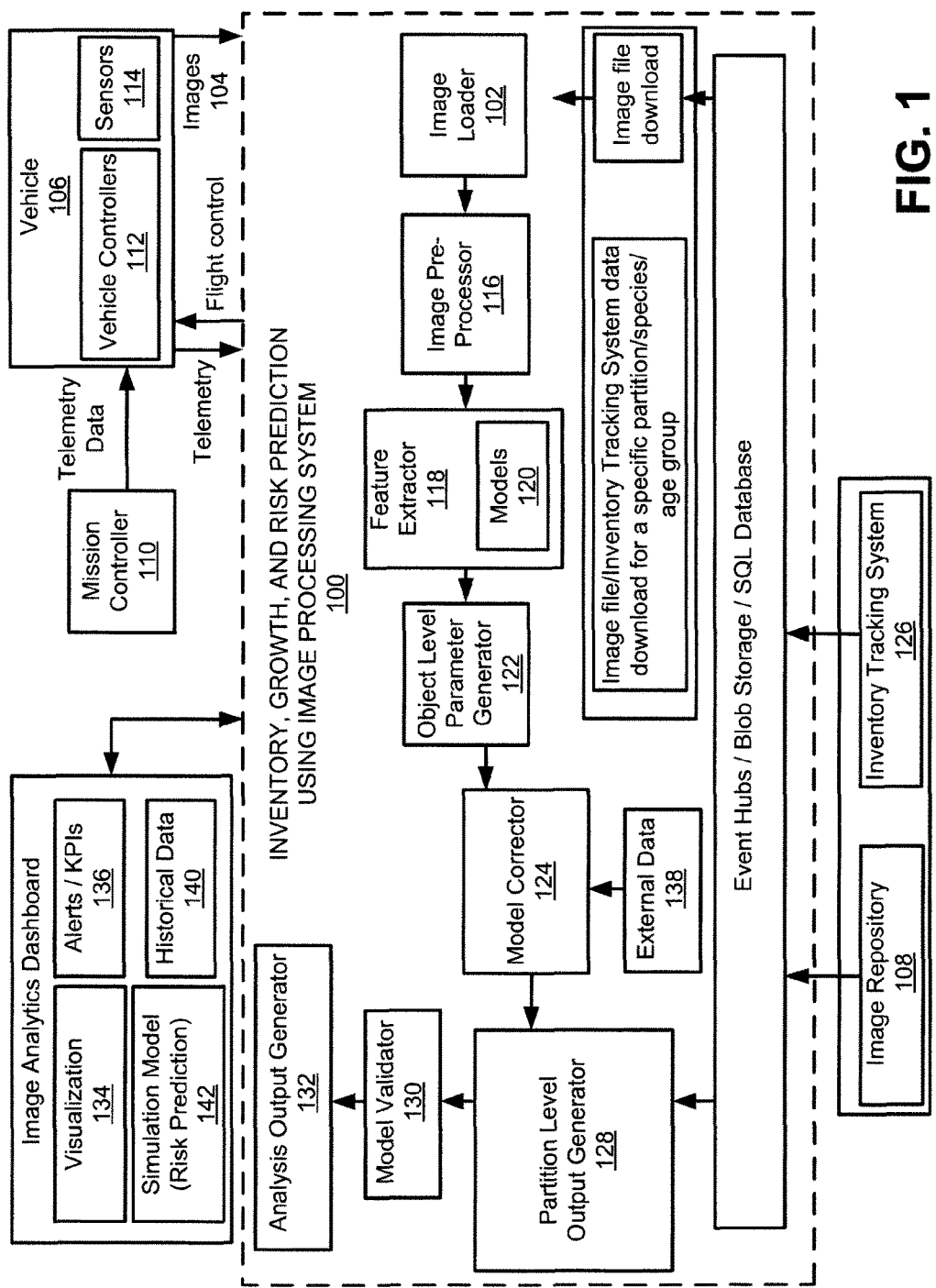
FIG. 1 illustrates a detailed architecture of an inventory, growth, and risk prediction using image processing system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to vehicles generally (e.g., UAVs, drones, unmanned land vehicles, manned aircraft, manned helicopters, manned land vehicles, satellites, etc.), such vehicles may be used to perform inventory, growth, and risk prediction using image processing as described herein. With improvements in sensors, data analytics capabilities, and programmatic mechanization components, vehicles may be used in a variety of ambiguous environments, and for performance of a variety of ambiguous tasks. For example, vehicles may be used for package delivery, agriculture, emergency services, pipeline inspection, etc. With respect to areas such as plantations, estates, agriculture, farms, cultivations such as agroforestry and agriculture cultivations, fields, nurseries, and other such areas that may be related to wood, pulp, and/or oil produce, agriculture cultivations, farm produce, etc., vehicles such as UAVs may be used to fly missions to capture images covering large areas. However, integration of vehicles with respect to inventory, growth, and risk prediction for such areas using computer vision and predictive analytics is limited.

In order to address the aforementioned technical challenges with respect to inventory, growth, and risk prediction for areas such as plantations, estates, agriculture, farms, cultivations such as agroforestry and agriculture cultivations, fields, nurseries, and other such areas that may be related to wood, pulp, and/or oil produce, agriculture cultivations, farm produce, etc., an inventory, growth, and risk prediction using image processing system and a method for inventory, growth, and risk prediction using image processing are disclosed herein. For the system and method disclosed herein, technologies, such as vehicles, signal processing, computer vision, machine learning, actuarial loss models, and advanced analytics may be used to ingest images as they are captured, for example, by UAVs, and to further analyze the images to identify key characteristics of the aforementioned areas, and spatial temporal trends for growth and damage related, for example, to trees, crops, shrubs, plants, cultivations, farm produce, and other such objects generally. In this regard, although examples disclosed herein may be described in the context of trees, forests, plantations, etc., the system and method disclosed herein may be applicable to any of the aforementioned types of areas and objects generally. The spatial temporal trend may be combined with simulation techniques to predict risk of losses that may impact yield. The system and method disclosed herein may provide for quicker estimation of inventory of trees (e.g., number of trees), their growth, identify areas which have low growth, send alerts for areas with no trees or low tree density, and identify possible pest issues for faster intervention.

Given the change in morphology of trees through different ages, the system and method disclosed herein may learn and build models for different age-groups (e.g., models for young trees right after planting, trees that are growing and not mature, and mature trees that are no longer growing and are near to harvest).

According to examples, the system and method disclosed herein may use combination of techniques including signal processing (e.g., Fourier and wavelet transforms), computer vision modeling (e.g., edge detection, template matching, texture analysis and color segmentation), and machine learning (e.g., Random forests, neural networks, etc.) to provide highly accurate inventory, growth, and risk prediction for forestry and plantation. For the system and method disclosed herein, the models that are generated and used for the image analysis may be unique to each tree species and age of a tree. These models may then be applied to the same tree species across other similar plantations. The system and method disclosed herein may identify a number of trees of a given species in a given partition (e.g., a smaller area of a plantation comprising of the same tree species and age-groups), crown size of each tree, and spatial density of trees. The crown size may be determined by identifying edges of each tree, and applying techniques such as convex hull to capture a closed polygon that most represents the crown size. The area of the convex hull may determine the crown size. Color segmentation, texture analysis, saturation based models, etc., may provide different set of features that are relevant for distinguishing the trees from the background (e.g., weeds, ground, roads etc.). These features may then be combined in a machine learning model to identify the location of trees. Color segmentation and machine learning may also be used to identify changes in chlorophyll levels indicative of possible tree distress for pest issues. Early identification of these issues may lead to faster intervention and lower loss.

According to examples, the system and method disclosed herein may integrate small sample detailed inspection that may be performed manually by field inspectors (e.g., 1% of a partition) which includes more detailed analysis of trees with 100% census of the area using a vehicle, such as a UAV. This may be based on leveraging Bayesian approaches and sampling theory to ensure that the 100% sample UAV image data is combined appropriately with the small sample inspection data to improve accuracy of the estimates while providing timely insights.

According to examples, the system and method disclosed herein may process images to identify features such as location of each tree and growth of each tree, and then combine the features with limited on-ground sampling to increase accuracy of prediction of inventory projections.

According to examples, the system and method disclosed herein may use a stream of images acquired through vehicles, such as UAVs, to identify individual trees in the image, the crown size of the tree, and spatial density of trees through a combination of signal processing, image processing, and machine learning.

According to examples, the system and method disclosed herein may determine customized models for each species of trees and age groups by learning the changes in the color of the tree canopy and shape of a tree (i.e., morphology) across different species and for the same species over time as the tree grows.

According to examples, the system and method disclosed herein may leverage semi-supervised and learning approaches, such as Bayesian learning approaches, to combine inferences from vehicle data (e.g., multiple images taken over different time periods) with a relatively small sample but detailed on-ground inspection data as labeled samples to increase both accuracy of inventory and accuracy of growth forecasts.

According to examples, the system and method disclosed herein may predict expected future yield over long term (e.g., 6 years) as trees mature, and risk of losses due to various factors such as wind damage, pest, disease, etc.

According to examples, the system and method disclosed herein may generate yield and growth forecasting models that leverage the crown measurements from UAV image data to predict the growth of trees in a partition. In this regard, Bayesian forecasting techniques may be used to incorporate incremental information obtained for the same partition and/or location through successive UAV flights over the life of a tree.

According to examples, the system and method disclosed herein may generate loss models by using simulation functions that incorporate the latest information on tree growth, loss of trees due to different factors such as wind (e.g., fallen trees in images), pests, and disease to provide an accurate estimate of expected yield and losses over time (e.g., 3 years, 4 years, etc.).

According to examples, the system and method disclosed herein may include optimization capabilities that leverage the simulated yield for an entire partition to identify an optimum harvesting schedule based on a combination of expected increment in yield due to growth, losses, and demand for the wood and/or pulp. The system and method disclosed herein may also leverage external data such as weather history to simulate the effect on losses such as fallen trees etc.

Based on the use of vehicles, such as UAVs, the inventory, growth, and risk prediction for forestry and plantation provided by the system and method disclosed herein may be performed in a time and cost effective manner, and in areas that may not be readily accessible by people.

According to examples, the system and method disclosed herein may utilize a mission controller to assign and manage a mission upon receipt of a work order. The mission controller may maintain knowledge of a fleet of vehicles, sensors, and crew, as well as information regarding work order status, and mission status. The mission controller may translate the work order into a mission request by assigning vehicles, sensors, and crew to the mission request, identifying a movement plan of the vehicle, and an objective for the mission. Once the mission is launched, the system and method disclosed herein may analyze communication data (e.g., telemetry data) received during the mission, and may generate alarms and/or other information based on the detection of risks. The mission controller may also be used to plan a mission based on alerts identified from previous missions, for example, if a UAV mission image indicates a potential pest issue and/or blank spot. Additional missions may be automatically (e.g., without human intervention) planned to visit the same region over time to confirm if an issue is growing or stabilizing based on corrective actions taken (e.g., pesticide spray, etc.)

With respect to the mission controller that tracks information regarding vehicles, sensors, and vehicle operation crew, vehicles may be tracked, for example, by type, availability, and ability to mount particular sensors. The mission controller may also track sensors by type, availability, and ability to be mounted on particular vehicles. Vehicle operation crews may also be tracked by availability and ability to operate particular vehicles.

The mission controller may receive a work order related to a vehicle mission. According to an example, work orders may be received from various enterprises and cover a variety of applications of vehicles. The mission controller may translate the work order into a mission request. A mission request may identify, for example, an operation for a vehicle, a type of a vehicle to complete the operation, at least one type of sensor to be mounted on the vehicle, a vehicle operation crew, a movement plan, and/or an objective for the mission. For example, a mission request may indicate that a fixed wing vehicle or quadcopter (i.e., types of vehicles) may be equipped with a photo camera to take images of a plantation. After launching the mission, the vehicle may follow the movement plan autonomously (e.g., for an unmanned vehicle), or with varying degrees of remote operator guidance from the mission controller. Sensors mounted onto the vehicle may transmit data in real-time to the mission controller, which may transmit relevant data to the system disclosed herein for further analysis. The transmission of the relevant data may occur either after vehicle landing (e.g., for aerial vehicles), mission completion, or in real-time based on bandwidth availability.

The system and method disclosed herein may be envisioned in a broad range of applications where automatic or automated assets based data analysis may be used to reduce cost, increase reliability, and increase productivity.

The system and method disclosed herein may account for aspects related to the state of vehicle technology, regulation and compliance, readiness, and safety and privacy. With respect to vehicle technology, the system and method disclosed herein may provide the hardware and software platform and setup for inventory, growth, and risk prediction using image processing.

The inventory, growth, and risk prediction using image processing system and the method for inventory, growth, and risk prediction using image processing disclosed herein provide a technical solution to technical problems related, for example, to inventory, growth, and risk prediction using image processing for forestry and plantations. The system and method disclosed herein provide the technical solution of an image pre-processor that is executed by at least one hardware processor to receive a plurality of images captured by a vehicle (e.g., a UAV) during movement of the vehicle along a vehicle path, where the plurality of images include a plurality of objects (e.g., trees, crop, etc.), and pre-process the plurality of images for feature extraction from the plurality of images. A feature extractor that is executed by the at least one hardware processor may extract a plurality of features (e.g., tree centers, tree edges, tree crowns, etc.) of the plurality of objects from the plurality of pre-processed images by using a combination of computer vision techniques. An object level parameter generator that is executed by the at least one hardware processor may determine at least one parameter (e.g., tree crown size, tree location, etc.) related to the plurality of objects from the plurality of extracted features. A partition level output generator that is executed by the at least one hardware processor may generate, based on the at least one determined parameter and the plurality of extracted features, a spatial density model to provide a visual indication of density of distribution of the plurality of objects related to a portion (e.g., a particular area) of at least one of the plurality of images, and/or an alert corresponding to the plurality of objects related to the portion of the at least one of the plurality of images. According to examples, the at least one parameter related to the plurality of objects may include at least one location related to the plurality of objects, and a model corrector that is executed by the at least one hardware processor may to utilize information related to a previous image to increase an accuracy of the at least one location related to the plurality of objects.

Inventory, Growth, and Risk Prediction Using Image Processing System 100

FIG. 1 illustrates a detailed architecture of an inventory, growth, and risk prediction using image processing system 100, according to an example of the present disclosure. The system 100 may include an image loader 102, executed by at least one hardware processor (e.g., at least one hardware processor 1102 of FIG. 10), to receive images 104 captured during movement of a vehicle 106 along a vehicle path, and telemetry data related to movement of the vehicle 106 along the vehicle path to be monitored. The images may be received directly from the vehicle 106, and/or from an image repository 108 that includes previously received images 104. The telemetry data may include, for example, movement log information (e.g., flight log information for an aerial vehicle, and generally, movement log information for ground based or other types of vehicles) related to movement of the vehicle 106 along the vehicle path, and georeference data related to the vehicle path. The telemetry data may be received from a mission controller 110, and/or from a setup user interface (not shown) in case of the georeference data. The mission controller 110 may be a component of the system 100, or disposed and/or operated separately as illustrated in FIG. 1.

The vehicle 106 may include various controls, such as autopilot control (e.g., if the vehicle 106 is an aerial vehicle), remote receiver control, etc., generally designated as vehicle controllers 112, and various sensors, such as flight sensors, temperature sensors, etc., and various imaging systems, such as photo or video cameras, IR sensors, etc., generally designated as vehicle sensors 114.

An image pre-processor 116 that is executed by the at least one hardware processor may analyze the images 104 to perform various operations such as color space transformations, local adaptive histogram equalization, image de-noising (i.e., smoothing and filtering), thresholding, and morphological transformations.

A feature extractor 118 that is executed by the at least one hardware processor may utilize computer vision techniques and machine learning to extract relevant features (e.g., tree centers, tree edges, tree crowns, etc.) from objects (e.g., trees) in the images 104 for generation of models 120 that are unique to each tree species and age of the trees (i.e., one model per tree species per tree age). Examples of computer vision techniques that may be used include Canny edge detection, signal processing based feature extraction, template matching and color segmentation, histogram back projection, watershed, texture analysis, etc. The extracted features may be stored in a SQL database.

An object level parameter generator 122 that is executed by the at least one hardware processor may identify various aspects of objects (e.g., trees) such as a tree crown size by identifying canopy edges of each tree, and using convex hull to capture a closed polygon most representing the crown size. The object level parameter generator 122 may further identify a GPS location of each of the identified trees.

A model corrector 124 that is executed by the at least one hardware processor may leverage past image information (e.g., from inventory tracking system 126) to improve accuracy of tree locations. The model corrector 124 may improve accuracy of the image analysis, for example, in cases of poor image quality, varying terrain, and difficulty in separating mature tree.

A partition level output generator 128 that is executed by the at least one hardware processor may generate spatial density models included in the models 120, where such spatial density models may be unique to each tree species and age of the trees. The spatial density models may identify areas with low tree density and low tree growth (e.g., based on crown size). The spatial density models may be stored in a SQL database. Further, tree growth from spatial densities (e.g., historical data 140 at different ages) may be combined with external data 138 (e.g., rainfall, wind, water table, pest, and disease) for generating risk prediction models. The risk prediction model may aim to simulate the effects of the external data 138 and the historical data 140 on yield and wood volumes.

A model validator 130 that is executed by the at least one hardware processor may validate the models 120 based on on-ground inventory samples (e.g., permanent sampling point) data, which may be used in forestry to estimate the inventory and wood volume.

An analysis output generator 132 that is executed by the at least one hardware processor may generate various visual displays 134 and/or alerts and key performance indicators (KPIs) 136 related to the images 104. The visual displays 134 may include various displays related to tree counting, density, tree crowns, maps related to a particular partition, etc. The alerts and KPIs 136 may include parameters related to the information presented in the various displays. For example, the alerts and KPIs 136 may include parameters related to height distribution of trees, low density areas, high density areas, blank spots in an area, etc. Additional processes that may lead to alerts include, for example, low density alert, alerts corresponding to risk of falling trees based on a simulation model 142 that takes the current stocking estimated from an image along with soil type, water table level sensor, weather data, etc., to predict which areas are at high risk of falling trees, pest issues, etc.

The elements of the system 100 described herein may be machine readable instructions stored on a non-transitory computer readable medium. In addition, or alternatively, the elements of the system 100 may be hardware or a combination of machine readable instructions and hardware.

Figure 2A:
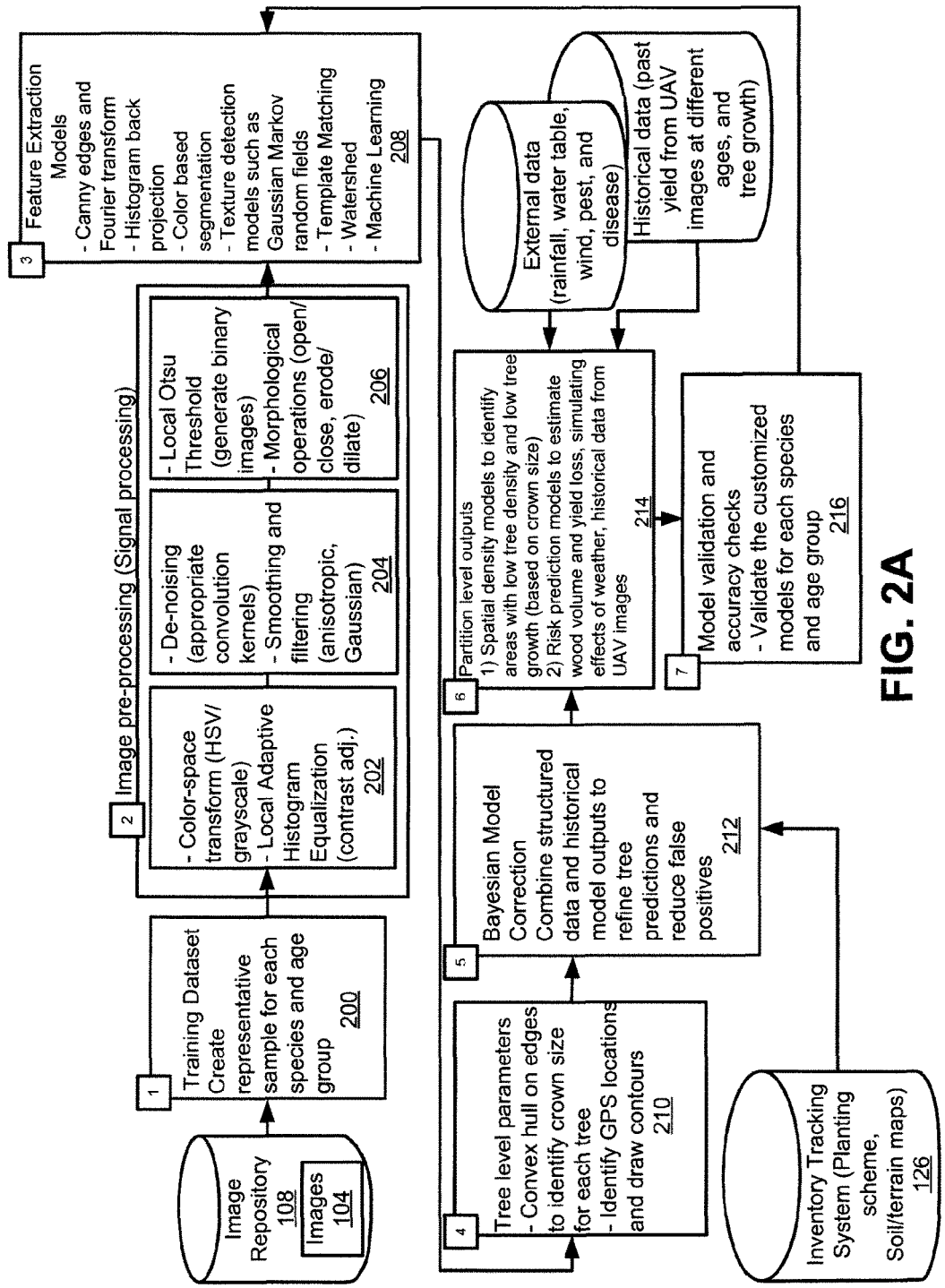
FIG. 2A illustrates a detailed flowchart for model generation for the inventory, growth, and risk prediction using image processing system of FIG. 1, according to an example of the present disclosure.

FIG. 2A illustrates a detailed flowchart for model generation for the system 100, according to an example of the present disclosure.

Training Dataset

Referring to block 200 of FIG. 2A, the system 100 may use the image repository 108 to generate a training dataset that represents a representative sample for each species and age group of trees. For UAVs, the image repository 108 may be designated as a UAV image repository. The image repository 108 may include a plurality of the images 104, which for UAVs may be designated as UAV images. The training dataset may be generated from true Red-Green-Blue (RGB) color images, NIR (Near Infra-Red) images, from the image repository 108, or from multi-spectral cameras with more channels and layers. In this regard, the image repository 108 may be used to generate the training dataset that includes multiple regions of interest (e.g., partitions that represent smaller areas of plantations comprising of same tree species and age-groups) across plantations (e.g., for each tree species and age-group) that include different degrees of image artifacts (e.g., noise). Examples of image artifacts may include weeds, large bush, roads, conservation areas, borders, image stitching issues, shadows, clouds, lighting conditions, elevation profiles, buildings, etc. The training dataset may be used, for example, by the feature extractor 118 as disclosed herein to learn and delineate tree crowns from complicated plantation images with different degrees of noise.

Image Pre-Processing (Signal Processing)

Referring to block 202 of FIG. 2A, with respect to color space transformations, the image pre-processor 116 may analyze the images 104 to remove shadows and highlight details, and color saturation, and determine by how much shadows and highlight details, and color saturation will be compromised. According to examples, with respect to color-space transformations, the image pre-processor 116 may utilize hue, saturation, and value (HSV), and grayscale to identify the difference between hue, saturation, and intensity channels for delineating an object of interest (e.g., tree crowns). The image pre-processor 116 may convert each RGB pixel to its corresponding HSV values for highlighting image details.

Referring to block 202 of FIG. 2A, with respect to local adaptive histogram equalization, the image pre-processor 116 may apply local adaptive histogram equalization to improve the local contrast of the images 104. Image pixel values (e.g., UAV image pixel values for UAV images) may be confined to a specific range of values as shown at 300 in FIG. 3, and hence may need a stretch of histogram as shown at 302 in FIG. 3 to either ends to cover pixel values from all regions of an image. The image pre-processor 116 may divide each image into tiles (e.g., 8×8 tiles), and apply contrast limiting.

Referring to block 204 of FIG. 2A, with respect to image de-noising (i.e., smoothing and filtering) for the images 104, the image pre-processor 116 may filter the images 104 with various low-pass and high-pass signal filters. A low pass filter may provide for the removal of noise, or blurring of an image. A high pass filter may facilitate identification of edges in an image. For example, in order to remove noise in the form of white and black spots, a median kernel window (e.g., 5×5) may be convolved on each pixel and the central pixel may be replaced with the window's median value. Similarly, the image pre-processor 116 may apply Gaussian filtering kernels for removing substantial noise and smoothing an image.

Referring to block 206 of FIG. 2A, with respect to thresholding and morphological transformations for the images 104, the image pre-processor 116 may threshold each image to segregate similar pixel values. Thresholding may create binary images from grey level images by turning all pixels below a predetermined threshold to zero and above another predetermined threshold to one, which may be primarily used for image segmentation. For a bimodal image with two histogram peaks, the image pre-processor 116 may take a value from the middle of the peaks as a threshold value (e.g., by applying Otsu binarization).

The image pre-processor 116 may apply morphological transformations on the binary images to refine boundaries of foreground objects. For example, morphological transformations may be considered as an erosion operation that may erode away the boundaries of foreground objects. Morphological transformations may be used, for example, to remove relatively small white noises, detach two connected objects, etc.

Feature Extraction and Machine Learning Models

Referring to block 208 of FIG. 2A, the feature extractor 118 may generate customized models 120 for specific tree species and age of the tree (i.e., one model per tree species and tree age). The models may be used to identify a number of trees of a given species in a given partition, crown size of each tree, and spatial density of trees. The feature extractor 118 may utilize computer vision techniques to extract relevant features from the data related to the identification of a number of trees of a given species in a given partition, crown size of each tree, and spatial density of trees. Examples of computer vision techniques that may be used include Canny edge detection, signal processing based feature extraction, template matching and color segmentation, histogram back projection, watershed, texture analysis, etc. Each of these computer vision techniques may include specific advantages and identify different features of an image. Examples of features that are extracted include tree centers, tree edges, tree crowns, etc. For example, the Canny edge detection technique may provide for the identification of edges under different lighting conditions, and is therefore more resistant to effects of shading caused by taller trees on shorter trees. The texture analysis based approach may provide for the detection of changes in texture across young and older leaves, and detect the center of trees (e.g., with younger leaves and the boundary between trees which include older leaves). In this regard, the feature extractor 118 may use a machine learning technique that combines all of these computer vision techniques together, and learns from the training dataset to identify a function that best separates individual trees and identifies the crown of each tree. In this regard, the machine learning technique may combine some or all of these computer vision techniques together to determine a combination that best separates individual trees and identifies the crown of each tree.

The feature extractor 118 may use a semi-supervised approach to reduce the amount of data that is analyzed. For example, with respect to forestry and plantation, each image may cover hundreds of acres, and greater than 100,000 trees. Thus, labeling of a location of each tree may unnecessarily increase the amount of data that is analyzed. Through semi-supervised learning, other structured information, such as a proposed planting scheme which provides the likely location of each tree at the start of planting, may be leveraged.

For each tree species and age (e.g., 3 months, 5 months, 10 months, 15 months, etc.), the feature extractor 118 may use the training dataset which includes areas of the same species and similar age group, and apply each of the aforementioned computer vision techniques to derive the features from the images 104.

With respect to Canny edge detection, the feature extractor 118 may determine the edge gradient and direction of each pixel to remove any unwanted pixels which may not constitute an edge. In this regard, the feature extractor 118 may also remove small pixel noises on the assumption that edges are long lines. The feature extractor 118 may use Fourier Transformation to determine the frequency representation of an image, and identify signal amplification at the edge points or noises. Based on color base segmentation, the feature extractor 118 may perform color quantization to reduce the number of colors in an image, and identify the corresponding color-space ranges for tree crowns. The feature extractor 118 may use texture based features to identify areas which have different textures and may be used to perform texture segmentation.

With respect to template matching, the feature extractor 118 may use template matching to slide a template image (e.g., a tree crown) over an input image, and compare the template and patch of input image under the template image. A grayscale image may be returned, where each pixel may denote a degree of matching of the neighborhood of that pixel with the template.

With respect to histogram back projection, the feature extractor 118 may use the histogram of a template image (e.g., a tree crown) to determine the probability of each input image pixel belonging to the template. The template based approach may be particularly applicable to species which include a well-defined and distinct shape of the crown (e.g., palm trees, mature eucalyptus, etc.).

With respect to watershed, any grayscale image may be viewed as a topographic surface where high intensity may denote peaks (e.g., center of tree crowns) and hills, while low intensity may denote valleys (e.g., image background). The feature extractor 118 may create barriers to facilitate segregation of overlapping tree crowns and segmentation results.

With respect to machine learning, for the training dataset, relatively small subsets may be used to manually identify the location of trees. The feature extractor 118 may use semi-supervised learning approaches which may use partially labeled data to learn which features and their combination is most effective in identifying the location of trees. The unlabeled locations of trees may be seen as missing data which may be seen as application of generative models which leverage semi-supervised learning as a missing data imputation task.

The machine learning technique may leverage planting information to identify tree spacing information, which may be used to identify each point X where a tree may potentially exist. The objective of supervised learning is to then confirm if a tree exists in that location. This is because trees may generally exist in areas where planting has been performed, and through the progression of age, the plantation trees die but are not replanted. The objective of the machine learning model is to identify $p(y|x)$, where a given point x includes label y (0: No tree, 1: tree exists). Using Bayes rule, it may be determined that $p(y|x)$ is proportional to $p(x|y)\ p(y)$. A probabilistic function $p(x|y, \theta)$ may be derived, where $\theta$ is a parameter vector derived from the features in the computer vision component. The generative model requires that the unlabeled data follow a mixture of individual-class distributions which may be obtained based on planting information that is provided for each image. The planting information may provide a two-dimensional Gaussian distribution for each tree location (e.g., across latitude and longitude) with a theoretical planting location being the center of the distribution.

The semi-supervised learning approach may be used to combine the features extracted from computer vision techniques to identify the function (i.e., based on the combination of computer vision techniques) that best predicts the tree location. The tree location information may be used in conjunction with edge detection to identify the location of each tree.

Tree Level Parameters

Referring to block 210 of FIG. 2A, for each tree that is detected, the object level parameter generator 122 may geo-tag each tree and identify pixel to world coordinates GPS positions. The object level parameter generator 122 may identify a tree crown size by identifying canopy edges of each tree, and using convex hull to capture a closed polygon most representing the crown size. The area of the convex hull may determine the crown size in pixels, which may be converted to physical scale by pixel to world mapping.

Bayesian Correction

Referring to block 212 of FIG. 2A, a model corrector 124 may leverage past image information (e.g., from inventory tracking system 126) to improve accuracy of tree location. With respect to vehicles such as UAVs, as UAV missions may be flown over the same area over different ages, the number of trees in an image at a given age (e.g., 36 months) may be derived as a function of prior information (i.e., number of trees and their location identified in the previous image and the updated information provided in the new image).

The model corrector 124 may improve accuracy of the image analysis, for example, in cases of poor image quality, varying terrain, and difficulty in separating mature tree. The mature (i.e., older) trees may include overlapping canopies, but at a younger age, such trees may be separable. In this regard, the model corrector 124 may leverage the previous image (e.g., the previous UAV image) as prior information at a younger age of the plantation to improve accuracy of tree location and counting. At the same time, the current image may include additional information such as trees lost due to diseases, flooding, etc. Thus, the ability to combine older image information as prior information with new image information may provide a posterior probability of each tree location.

Partition Level Outputs

Referring to block 214 of FIG. 2A, the partition level output generator 128 may generate spatial density models included in the models 120 as output, where such spatial density models may be unique to each tree species and age of the trees. The spatial density models may be applied to the same tree species across other similar plantations. The models 120 may be used to detect each tree species based on their UAV orthographic image.

The partition level output generator 128 may use color segmentation and machine learning to identify changes in chlorophyll levels indicative of possible tree distress for pest issues. In this regard, early identification of such issues may lead to faster intervention and lower loss.

The partition level output generator 128 may generate spatial density maps for visualizing low density areas across the plantations. In this regard, the partition level output generator 128 may generate actionable alerts for blank spot identification, and stocking and height distribution alarms based on correlation between crown diameter and tree height.

The partition level output generator 128 may leverage the model outputs to estimate the yield from a partition (e.g., inventory for mature trees) and inventory, growth, and risk prediction (e.g., for younger trees risk of falling due to wind, pest risk, etc.) using data related to the number of trees, estimated tree diameter based on crown size, other sensor data including water table level, historical and forecasted weather data (e.g., wind speed, rainfall, etc.). The risk prediction model may learn the relationship between the multitude of variables to risk of each tree falling down (e.g., increased density of trees (higher stocking) may result in thinner trees which are more sensitive to falling down under certain wind conditions. In this regard, the simulation model 142 may take the past yield at harvest, estimated wood volumes from a number of trees at different ages/growth, and the number of fallen trees as a function of f(x1, x2, x3 . . . ), where the 'x' variables may represent wind, water table, rainfall, pest and disease, densities, etc.).

Model Validation and Accuracy

Referring to block 216 of FIG. 2A, the model validator 130 may validate the models 120 based on on-ground inventory samples (e.g., permanent sampling point) data, which may be used in forestry to estimate the inventory and wood volume. On-ground sampling may pertain to intensive evaluation of trees (e.g., location, height, and tree diameter (DBH)) on a relatively small sample of trees (e.g., 1-3%). With respect to UAVs, UAV based analysis may cover all of the trees, with estimates for tree location and crown size. In this regard, combining these two techniques (i.e., on-ground sampling and UAV based analysis) in a machine learning approach (e.g., semi-supervised) may facilitate combining the information from both of these sources to improve inventory prediction (e.g., merchantable volume of trees in a given partition).

Figure 2B:
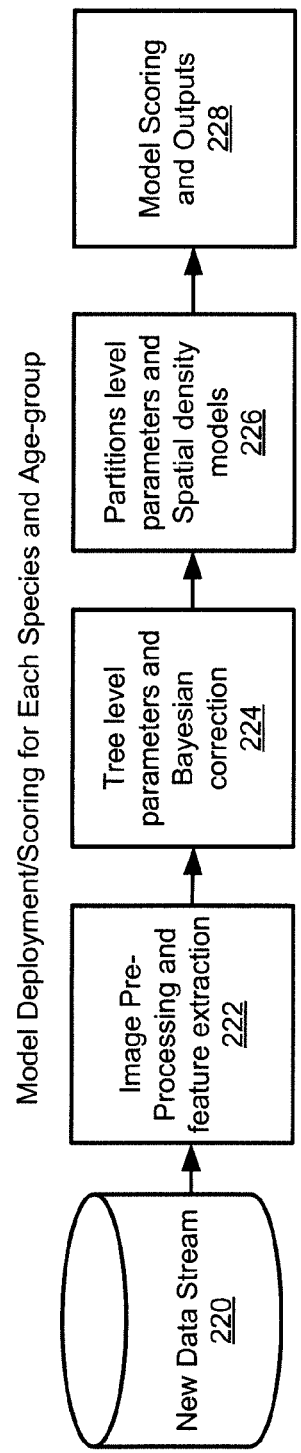
FIG. 2B illustrates a detailed flowchart for model deployment for the inventory, growth, and risk prediction using image processing system of FIG. 1, according to an example of the present disclosure.

FIG. 2B illustrates a detailed flowchart for model deployment for the system 100, according to an example of the present disclosure.

Referring to FIG. 2B, the models 120 that are generated as disclosed herein with reference to FIGS. 1 and 2A may be deployed for analysis of images 104 for a new data stream 220. For the example of a UAV, the new data stream 220 may be designated as a UAV new data stream.

At block 222, image pre-processing and feature extraction may be performed as disclosed herein with reference to the image pre-processor 116 and the feature extractor 118, respectively. In this regard, based on the machine learning technique utilized by the feature extractor 118 during the training phase as disclosed herein with reference to block 208 of FIG. 2A, the feature extractor 118 may use an optimal combination of the computer vision techniques to separate individual trees and identify the crown of each tree.

At block 224, tree level parameters may be determined and model correction may be performed as disclosed herein with reference to the object level parameter generator 122 and the model corrector 124, respectively.

At block 226, partition level parameters and spatial density models may be determined as disclosed herein with reference to the partition level output generator 128.

At block 228, model scoring and outputs may be determined as disclosed herein with reference to the analysis output generator 132 to generate various visual displays 134 and/or alerts and KPIs 136 related to the images 104.

Figure 4:
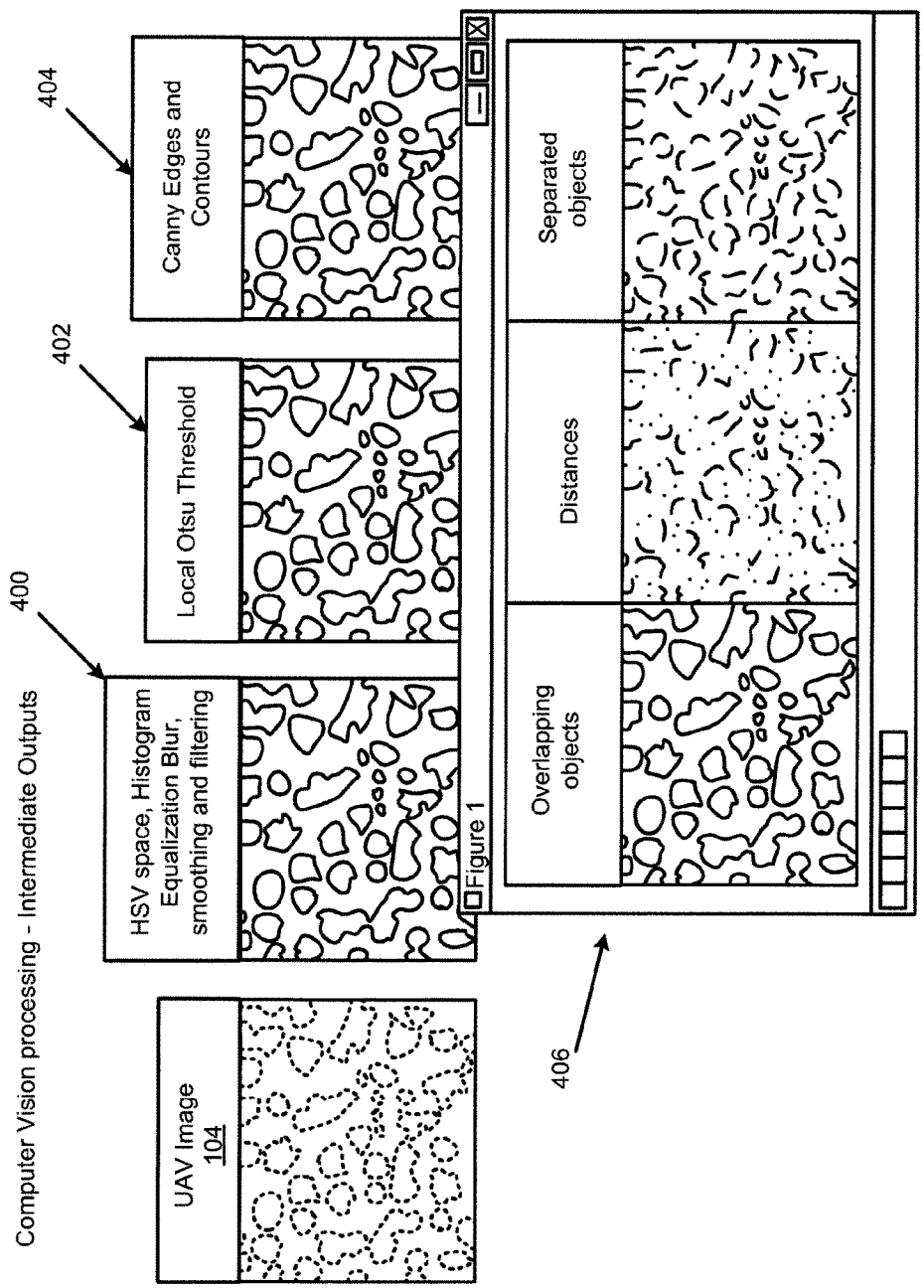
FIG. 4 illustrates intermediate outputs for the inventory, growth, and risk prediction using image processing system of FIG. 1, according to an example of the present disclosure.

FIG. 4 illustrates intermediate outputs for the system 100, according to an example of the present disclosure.

As disclosed herein with reference to the image pre-processor 116, the image pre-processor 116 may utilize HSV, local adaptive histogram equalization, and de-noising (i.e., smoothing and filtering) for the images 104. In this regard, for a UAV image 104 as shown in FIG. 4, an example of an intermediate output display after image pre-processing is illustrated at 400. Further, with respect to thresholding, an example of an intermediate output display after image pre-processing is illustrated at 402.

As disclosed herein with reference to the feature extractor 118, the feature extractor 118 may generate the customized models 120 for specific tree species and age of the tree (i.e., one model per tree species and tree age). The models may be used to identify a number of trees of a given species in a given partition, crown size of each tree, and spatial density of trees. The feature extractor 118 may utilize computer vision techniques to extract relevant features from the data related to the identification of a number of trees of a given species in a given partition, crown size of each tree, and spatial density of trees. Examples of computer vision techniques that may be used include Canny edge detection, signal processing based feature extraction, template matching and color segmentation, histogram back projection, watershed, texture analysis, etc. For example, for the UAV image 104 as shown in FIG. 4, an example of an intermediate output display based on application of Canny edge detection is illustrated at 404.

Further, as disclosed herein with reference to the feature extractor 118, the feature extractor 118 may create barriers to facilitate segregation of overlapping tree crowns and segmentation results. In this regard, for the UAV image 104 as shown in FIG. 4, examples of intermediate output displays with respect to overlapping objects (e.g., tree crowns), distances between trees, and separated objects are illustrated at 406.

Figure 5:
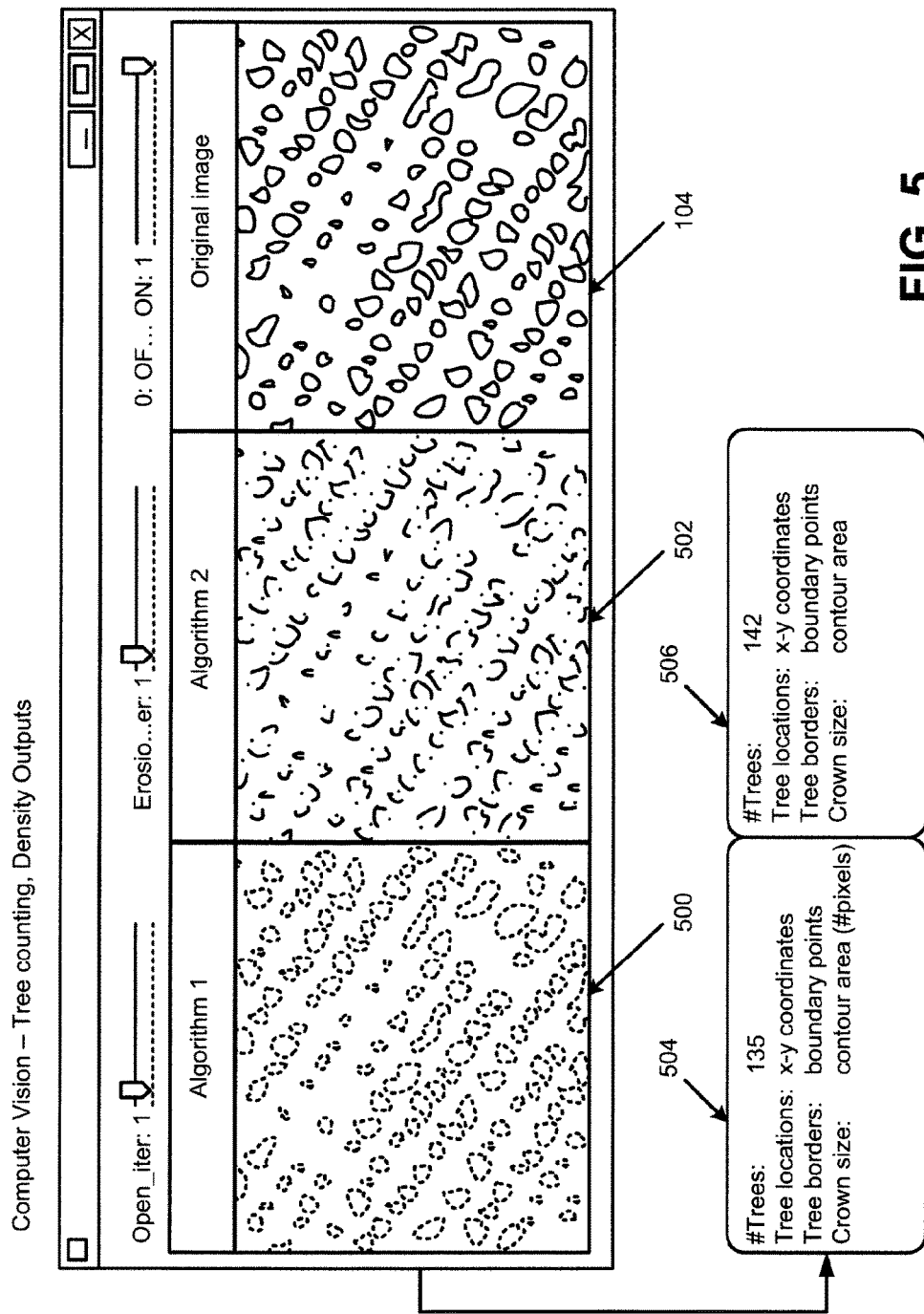
FIG. 5 illustrates tree counting and density outputs for the inventory, growth, and risk prediction using image processing system of FIG. 1, according to an example of the present disclosure.

FIG. 5 illustrates tree counting and density outputs for the system 100, according to an example of the present disclosure.

As disclosed herein with reference to the partition level output generator 128, the partition level output generator 128 may generate spatial density models included in the models 120 as output, where such spatial density models may be unique to each tree species and age of the trees. For example, for a UAV image 104 as shown in FIG. 5, examples of intermediate output displays with respect to such spatial density models are illustrated at 500 and 502. The intermediate output displays illustrated at 500 and 502, with corresponding statistics displayed at 504 and 506, may reflect spatial density models that are generated based on first and second combinations of the computer vision techniques used by the feature extractor 118. In this regard, it can be seen that different combinations of the computer vision techniques used by the feature extractor 118 may result in an indication of a different number of trees (e.g., 135 trees for the combination used with the intermediate output display at 500, and 142 trees for the combination used with the intermediate output display at 502).

Figure 6:
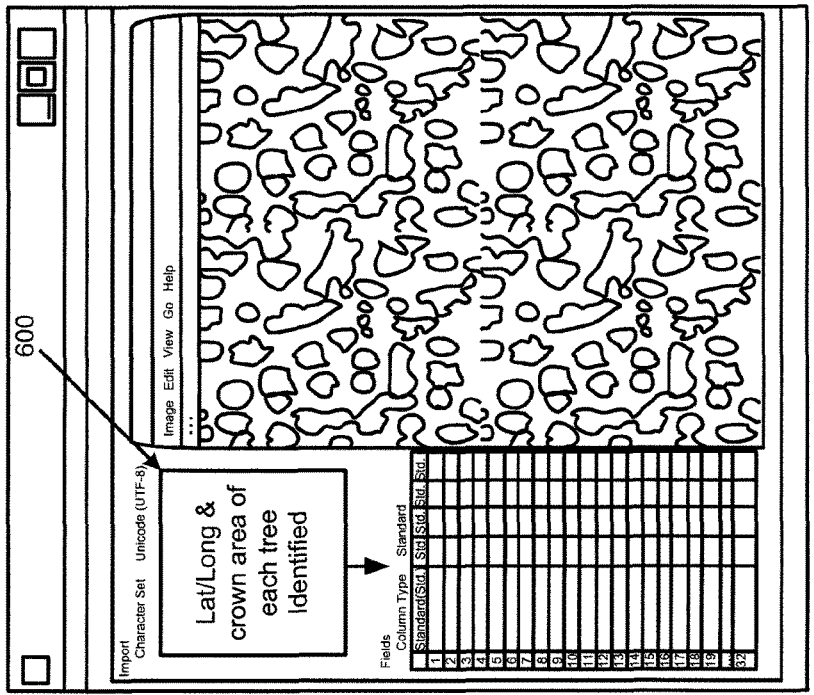
FIG. 6 illustrates computer vision processing for one partition for the inventory, growth, and risk prediction using image processing system of FIG. 1, according to an example of the present disclosure.

FIG. 6 illustrates computer vision processing for one partition for the system 100, according to an example of the present disclosure.

As disclosed herein with reference to the object level parameter generator 122, the object level parameter generator 122 may geo-tag each tree and identify pixel to world coordinates GPS positions. The object level parameter generator 122 may identify a tree crown size by identifying canopy edges of each tree, and using convex hull to capture a closed polygon most representing the crown size. For example, as illustrated in FIG. 6, latitude/longitude positions and crown area for each tree may be displayed at 600.

Figure 7:
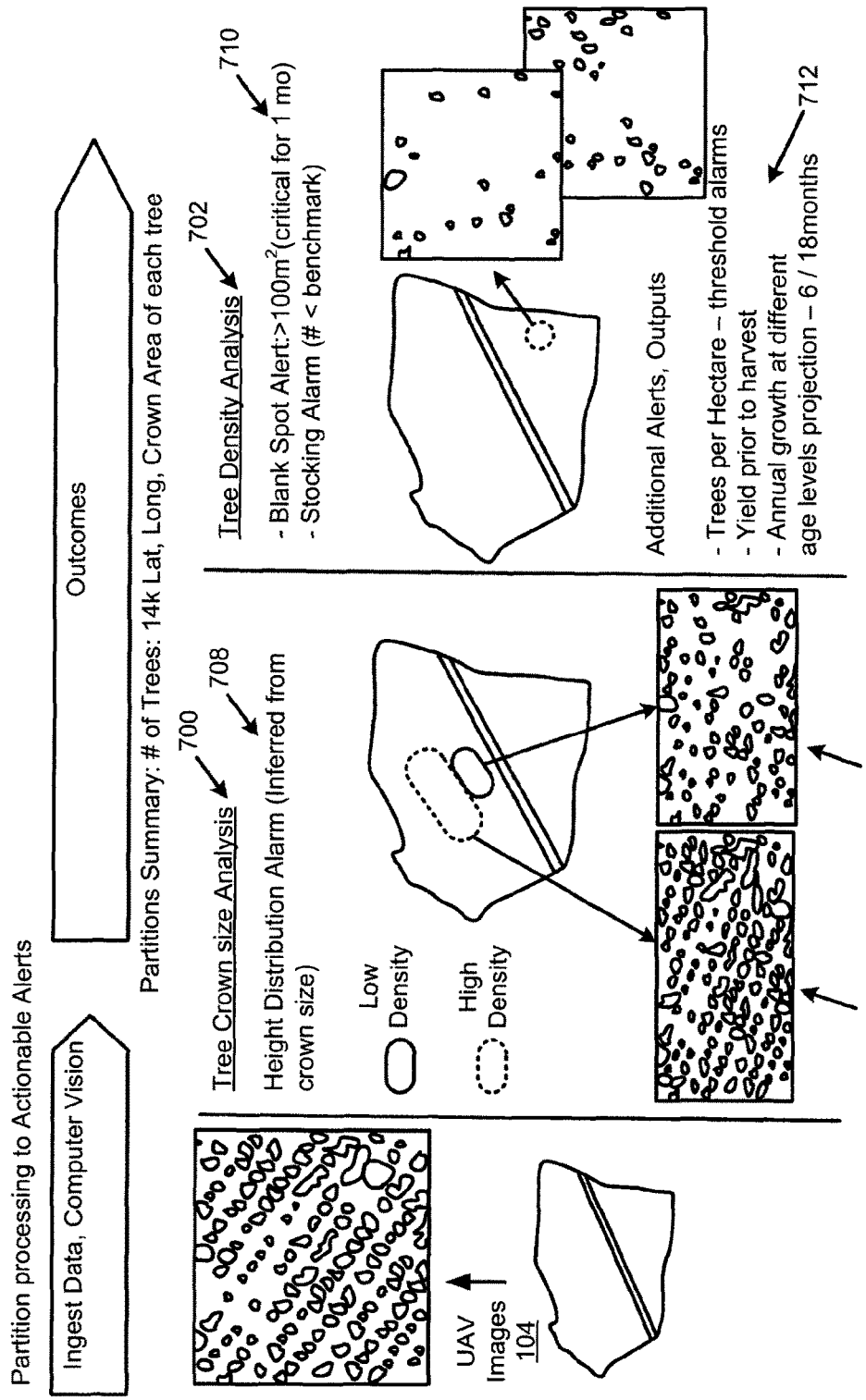
FIG. 7 illustrates partition processing to actionable alerts for the inventory, growth, and risk prediction using image processing system of FIG. 1, according to an example of the present disclosure.

FIG. 7 illustrates partition processing to actionable alerts for the system 100, according to an example of the present disclosure.

As disclosed herein with reference to the partition level output generator 128, the partition level output generator 128 may generate spatial density models included in the models 120 as output, where such spatial density models may be unique to each tree species and age of the trees. For example, for UAV images 104 as shown in FIG. 7, examples of outputs with respect to a spatial density model for tree crown size analysis and tree density analysis are respectively illustrated at 700 and 702. The spatial density model may be used to provide an indication of inventory of trees, current growth of trees, and prediction of future growth of trees based on comparison of past and current spatial density models. For example, an inventory of trees may be based on a number of trees per given area. A current growth of trees may be based on an analysis of a number of trees per given area, and a crown size of the trees. Further, prediction of future growth of trees may be based on a comparison of a number of trees and crown size (and other factors) for a past spatial density model to a current spatial density model.

With respect to the tree crown size analysis, the spatial density model may identify and/or highlight areas of high and low density, for example, at 704 and 706, respectively. In this regard, the analysis output generator 132 may generate various visual displays 134 and/or alerts and KPIs 136 related to the images 104. The visual displays 134 may include various displays related to tree counting, density, tree crowns, maps related to a particular partition, etc. The alerts and KPIs 136 may include parameters related to the information presented in the various displays. For example, the alerts and KPIs 136 may include parameters related to height distribution of trees, low density areas, high density areas, blank spots in an area, etc.

For example, at 708, the analysis output generator 132 may generate a height distribution alarm (e.g., a KPIs 136) that is inferred from tree crown size (e.g., a tree crown size X may correspond to a tree height AX, where A represents a constant). For example, for a tree crown size that exceeds a predetermined tree crown size threshold, the analysis output generator 132 may generate a height distribution alarm that indicates whether a corresponding tree includes a height that is greater than a predetermined height threshold.

According to another example, at 710, the analysis output generator 132 may generate other KPIs 136 such as a blank spot alert and/or a stocking alarm based on a density analysis. For example, for any blank spots greater than a predetermined blank spot area threshold (e.g., 300 m$^2$), the analysis output generator 132 may generate a blank spot alert, and provide corresponding visual indicators as shown in FIG. 7 and/or reports related to the blank spot alert. The blank spot alert may be correlated to a time period threshold for such blank spots (e.g., 1 month, where a blank spot alert is generated for a blank spot that is present for greater than the time period threshold). Further, for any areas that include a number of trees that are less than a predetermined tree number threshold (e.g., 10 trees per 100 m$^2$), the analysis output generator 132 may generate a stocking alarm. Additional alarms may include, for example, alarms illustrated at 712 that include trees per area (e.g., if a number of trees per Hectare are less than or greater than a predetermined threshold that may be used for tree harvesting purposes), wood volume (e.g., if a wood volume for an area is less than or greater than a predetermined threshold that may be used for tree harvesting purposes), yield prior to harvest, and annual growth at different age levels projection (e.g., six months and eighteen months).

Risk Prediction Simulation

Figure 8:
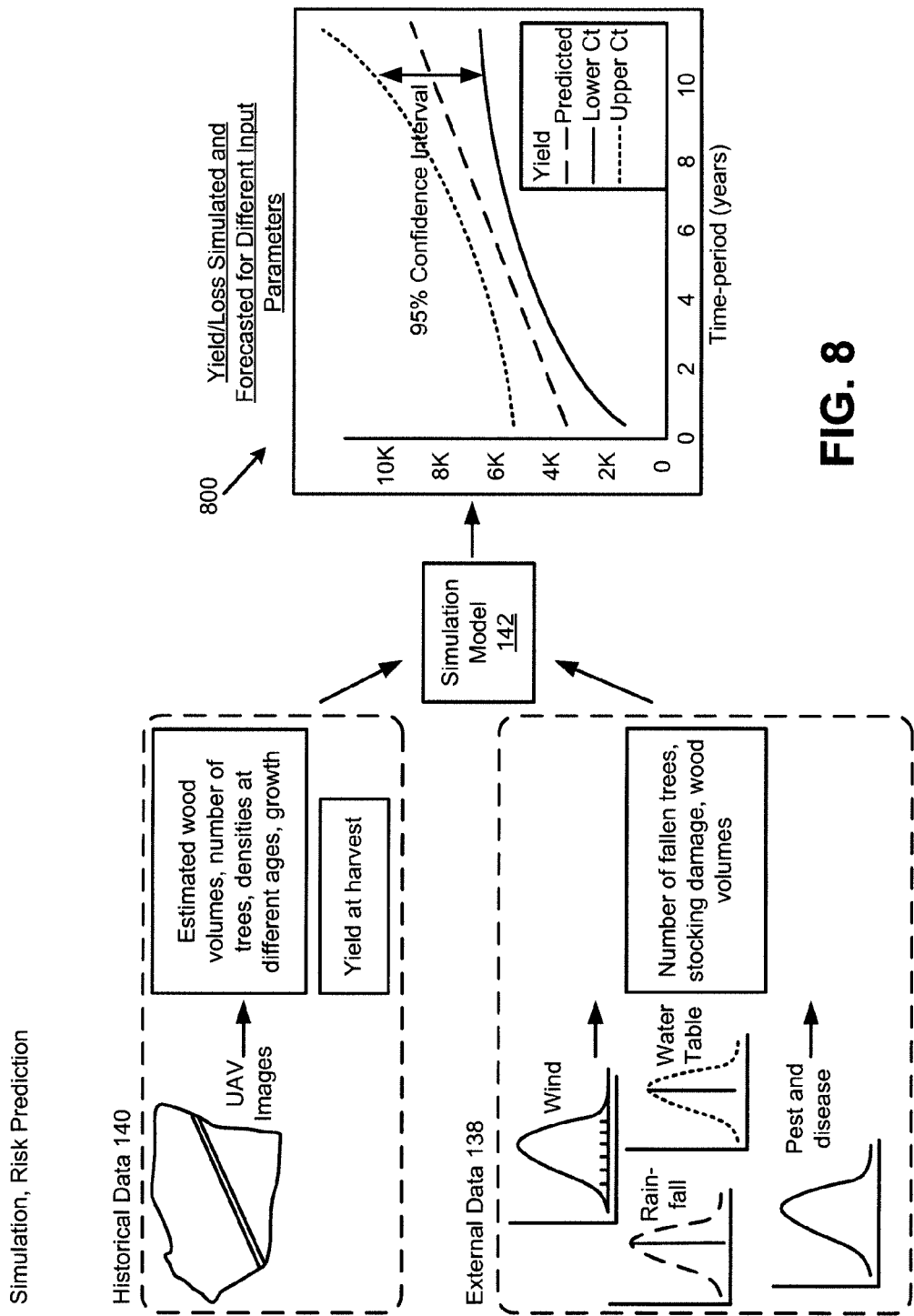
FIG. 8 illustrates risk prediction simulation using the inventory, growth, and risk prediction using image processing system of FIG. 1, according to an example of the present disclosure.

FIG. 8 illustrates risk prediction simulation using the system 100, according to an example of the present disclosure.

Referring to FIG. 8, the partition level output generator 128 may generate, based on the determined parameters from the object level parameter generator 122, the plurality of extracted features from the feature extractor 118, the historical data 140 related to consumption of the plurality of trees at different ages of the plurality of trees, and the external data 138 (i.e., external effect data) related to external effects on the plurality of trees, the simulation model 142 (i.e., risk prediction model) to simulate, as shown at 800, effects of the historical data 140 and the external effect data 138 on the consumption of the plurality of trees.

Figure 9:
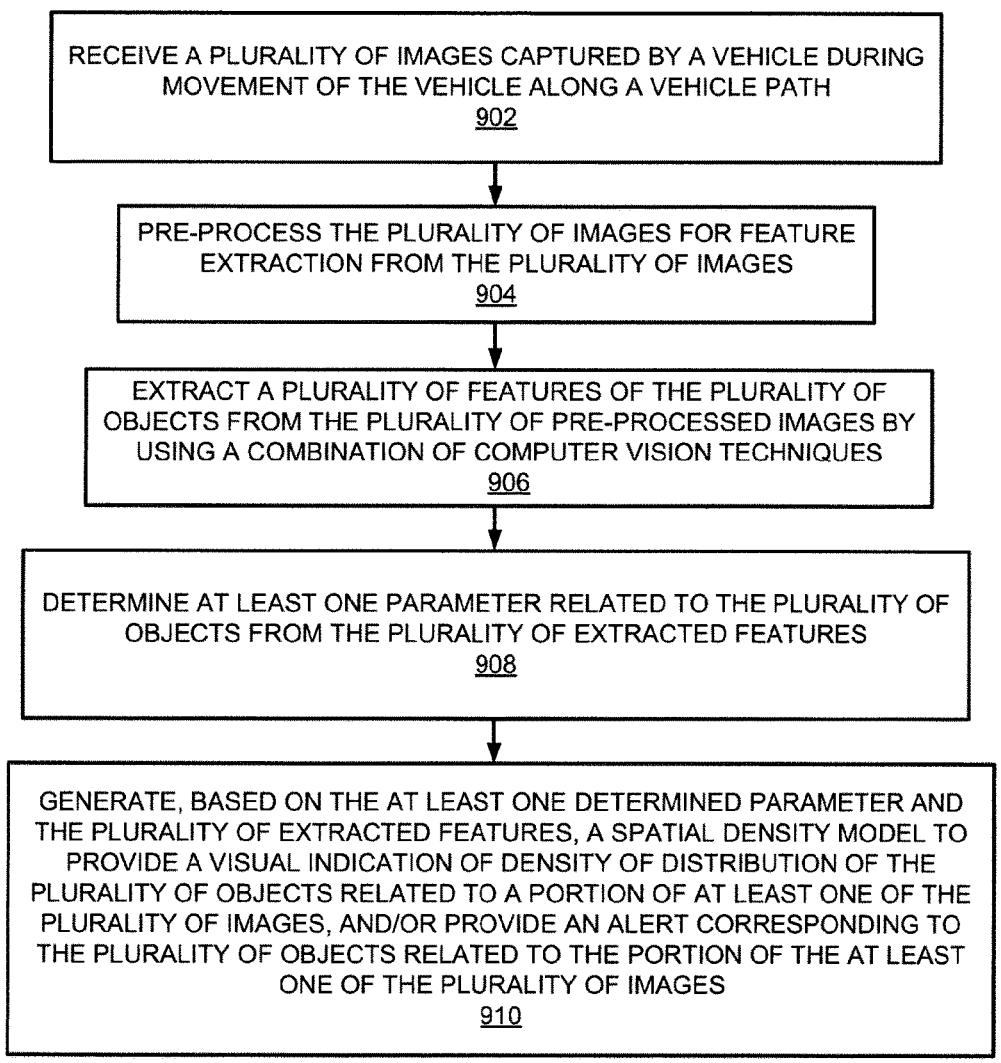
FIG. 9 illustrates a method for inventory, growth, and risk prediction using image processing, according to an example of the present disclosure.
Figure 10:
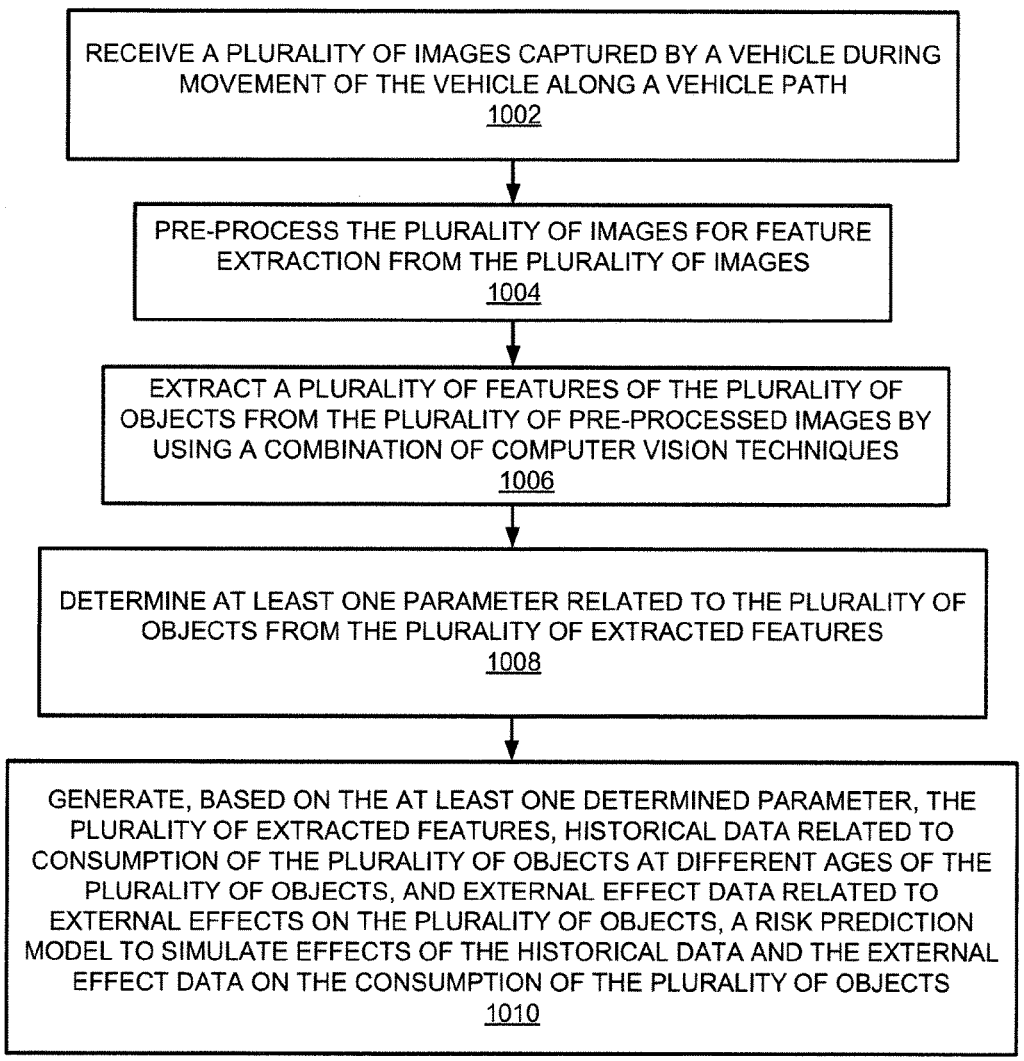
FIG. 10 illustrates a method for inventory, growth, and risk prediction using image processing, according to an example of the present disclosure.

FIGS. 9 and 10 illustrate flowcharts of methods 900 and 1000 for inventory, growth, and risk prediction using image processing, according to examples. The methods 900 and 1000 may be implemented on the inventory, growth, and risk prediction using image processing system 100 described above with reference to FIGS. 1-8 by way of example and not limitation. The methods 900 and 1000 may be practiced in other systems.

Referring to FIGS. 1 and 9, at block 902, the method 900 may include receiving a plurality of images 104 captured by a vehicle 106 during movement of the vehicle 106 along a vehicle path, where the plurality of images 104 may include a plurality of objects.

At block 904, the method 900 may include pre-processing the plurality of images 104 for feature extraction from the plurality of images 104.

At block 906, the method 900 may include extracting a plurality of features of the plurality of objects from the plurality of pre-processed images by using a combination of computer vision techniques.

At block 908, the method 900 may include determining at least one parameter related to the plurality of objects from the plurality of extracted features.

At block 910, the method 900 may include generating, based on the at least one determined parameter and the plurality of extracted features, a spatial density model to provide a visual indication of density of distribution of the plurality of objects related to a portion of at least one of the plurality of images 104, and/or an alert corresponding to the plurality of objects related to the portion of the at least one of the plurality of images 104.

According to examples, the at least one parameter related to the plurality of objects may include at least one location related to the plurality of objects, and the method 900 may include utilizing information related to a previous image to increase an accuracy of the at least one location related to the plurality of objects.

According to examples, for the method 900, the plurality of objects may include trees and/or crops.

According to examples, for the method 900 the vehicle 106 may include a UAV.

According to examples, the method 900 may include removing shadows and highlight details from the plurality of images 104, and/or applying local adaptive histogram equalization to modify a local contrast of the plurality of images 104.

According to examples, the method 900 may include applying low pass filtering for noise removal from the plurality of images 104, and applying high pass filtering for identification of edges of the plurality of objects.

According to examples, the method 900 may include utilizing thresholding to create binary images 104 of the plurality images 104 by turning pixels below a predetermined threshold to a first value and pixels above another predetermined threshold to a second value, and applying morphological transformations on the binary images 104 to refine boundaries of foreground objects.

According to examples, the method 900 may include extracting the plurality of features of the plurality of objects from the plurality of pre-processed images by using the combination of computer vision techniques that includes at least two of Canny edge detection, signal processing based feature extraction, template matching and color segmentation, histogram back projection, watershed, and texture analysis.

According to examples, the plurality of objects include trees, and the method 900 may include extracting the plurality of features of the plurality of trees from the plurality of pre-processed images by using the combination of computer vision techniques by using a machine learning technique to determine the combination of computer vision techniques to identify a function that separates individual trees and identifies a crown of each of the trees.

According to examples, the method 900 may include using the machine learning technique to determine the combination of computer vision techniques to identify the function that separates individual trees and identifies the crown of each of the trees by using a semi-supervised machine learning technique based on past planting information related to a likely location of each of the trees.

According to examples, the plurality of objects include trees, and the method 900 may include determining the at least one parameter that includes a crown size of each of the plurality of trees based on convex hull analysis, and a location of each of the plurality of trees.

According to examples, for the method 900, the visual indication of density of distribution of the plurality of objects related to the portion of the at least one of the plurality of images 104 may include a display of low density and high density areas related to the portion of the at least one of the plurality of images 104.

According to examples, the plurality of objects may include trees, and the visual indication of density of distribution of the plurality of trees related to the portion of the at least one of the plurality of images 104 may include a display related to a height of the plurality of trees, where the height of the plurality of trees may be determined based on a crown size of each of the plurality of trees.

According to examples, the alert corresponding to the plurality of objects related to the portion of the at least one of the plurality of images 104 may include an indication of a low density area in the portion based on existence of the low density area for greater than a predetermined time period.

According to examples, the plurality of objects include trees, and the method 900 may include using color segmentation to identify changes in chlorophyll levels of the plurality of trees, where the alert corresponding to the plurality of trees related to the portion of the at least one of the plurality of images 104 includes an indication of possible pests based on changes in the chlorophyll levels of the plurality of trees.

Referring to FIGS. 1 and 10, at block 1002, the method 1000 may include receiving a plurality of images 104 captured by a vehicle 106 during movement of the vehicle 106 along a vehicle path, where the plurality of images 104 may include a plurality of objects.

At block 1004, the method 1000 may include pre-processing, by a hardware processor, the plurality of images 104 for feature extraction from the plurality of images 104.

At block 1006, the method 1000 may include extracting a plurality of features of the plurality of objects from the plurality of pre-processed images by using a combination of computer vision techniques.

At block 1008, the method 1000 may include determining at least one parameter related to the plurality of objects from the plurality of extracted features.

At block 1010, the method 1000 may include generating, based on the at least one determined parameter, the plurality of extracted features, historical data 140 related to consumption of the plurality of objects at different ages of the plurality of objects, and external effect data related to external effects on the plurality of objects, a simulation model 142 (risk prediction model) to simulate effects of the historical data 140 and the external effect data on the consumption of the plurality of objects.

According to examples, the plurality of objects may include trees, the historical data 140 may include tree density at different ages and yield at harvest, and the external effect data may include weather and/or pest related effects on the plurality of trees, and generating, based on the at least one determined parameter, the plurality of extracted features, the historical data 140, and the external effect data, the simulation model 142 (risk prediction model) to simulate effects of the historical data 140 and the external effect data on the consumption of the plurality of trees may further include generating, based on the at least one determined parameter, the plurality of extracted features, the historical data 140, and the external effect data, the simulation model 142 (risk prediction model) to simulate yield and loss related to the plurality of trees.

According to examples, a method for inventory, growth, and risk prediction using image processing may include receiving a plurality of images 104 captured by a vehicle 106 during movement of the vehicle 106 along a vehicle path, where the plurality of images 104 may include a plurality of objects, and pre-processing the plurality of images 104 for feature extraction from the plurality of images 104. The method for inventory, growth, and risk prediction using image processing may include extracting a plurality of features of the plurality of objects from the plurality of pre-processed images by using a combination of computer vision techniques, and determining at least one parameter related to the plurality of objects from the plurality of extracted features. The method for inventory, growth, and risk prediction using image processing may include generating, based on the at least one determined parameter and the plurality of extracted features, a spatial density model to provide a visual indication of density of distribution of the plurality of objects related to a portion of at least one of the plurality of images 104, and/or an alert corresponding to the plurality of objects related to the portion of the at least one of the plurality of images 104. The method for inventory, growth, and risk prediction using image processing may include generating, based on the at least one determined parameter, the plurality of extracted features, historical data 140 related to consumption of the plurality of objects at different ages of the plurality of objects, and external effect data related to external effects on the plurality of objects, a simulation model 142 (risk prediction model) to simulate effects of the historical data 140 and the external effect data on the consumption of the plurality of objects. The method for inventory, growth, and risk prediction using image processing may include extracting the plurality of features of the plurality of objects from the plurality of pre-processed images by using the combination of computer vision techniques by using a machine learning technique to determine the combination of computer vision techniques to identify a function that separates individual objects.

Figure 11:
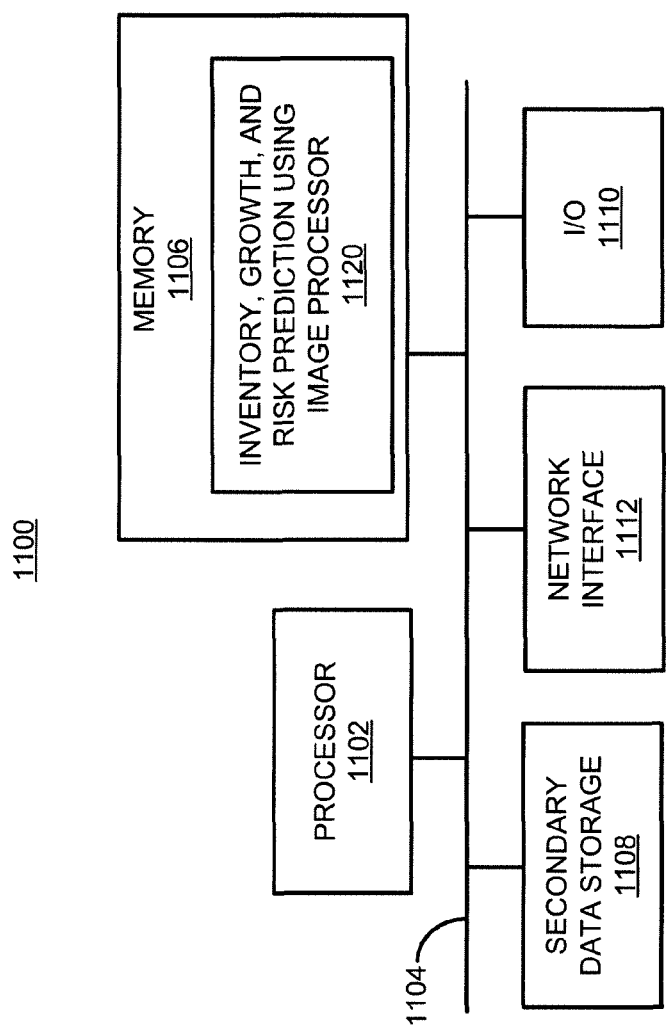
FIG. 11 illustrates a computer system, according to an example of the present disclosure.

FIG. 11 shows a computer system 1100 that may be used with the examples described herein. The computer system may represent a generic platform that includes components that may be in a server or another computer system. The computer system 1100 may be used as a platform for the system 100. The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1100 may include a processor 1102 that may implement or execute machine readable instructions performing some or all of the methods, functions and other processes described herein. Commands and data from the processor 1102 may be communicated over a communication bus 1104. The computer system may also include a main memory 1106, such as a random access memory (RAM), where the machine readable instructions and data for the processor 1102 may reside during runtime, and a secondary data storage 1108, which may be non-volatile and stores machine readable instructions and data. The memory and data storage are examples of computer readable mediums. The memory 1106 may include an inventory, growth, and risk prediction using image processor 1120 including machine readable instructions residing in the memory 1106 during runtime and executed by the processor 1102. The inventory, growth, and risk prediction using image processor 1120 may include the elements of the system 100 shown in FIG. 1.

The computer system 1100 may include an I/O device 1110, such as a keyboard, a mouse, a display, etc. The computer system may include a network interface 1112 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An inventory, growth, and risk prediction using image processing system comprising:
   an image pre-processor, executed by at least one hardware processor, to
      receive a plurality of images captured by a vehicle during movement of the vehicle along a vehicle path, where the plurality of images include a plurality of objects, and where the plurality of objects include at least one of trees or crops, and
      pre-process the plurality of images for feature extraction from the plurality of images;
   a feature extractor, executed by the at least one hardware processor, to extract a plurality of features of the plurality of objects from the plurality of pre-processed images by using a combination of computer vision techniques that includes at least two of
      Canny edge detection,
      signal processing based feature extraction,
      template matching and color segmentation,
      histogram back projection,
      watershed, and
      texture analysis, where for the plurality of objects that include trees, the feature extractor is to use a machine learning technique to determine the combination of computer vision techniques to identify a function that separates individual trees and identifies a crown of each of the trees, and where the machine learning technique includes a semi-supervised machine learning technique based on past planting information related to a likely location of each of the trees;

an object level parameter generator, executed by the at least one hardware processor, to determine at least one parameter related to the plurality of objects from the plurality of extracted features; and a partition level output generator, executed by the at least one hardware processor, to generate, based on the at least one determined parameter and the plurality of extracted features, a spatial density model to provide at least one of a visual indication of density of distribution of the plurality of objects related to a portion of at least one of the plurality of images, or an alert corresponding to the plurality of objects related to the portion of the at least one of the plurality of images.

2. The inventory, growth, and risk prediction using image processing system according to claim 1, where the at least one parameter related to the plurality of objects includes at least one location related to the plurality of objects, further comprising:

a model corrector, executed by the at least one hardware processor, to utilize information related to a previous image to increase an accuracy of the at least one location related to the plurality of objects.

3. The inventory, growth, and risk prediction using image processing system according to claim 1, where the vehicle includes an unmanned aerial vehicle (UAV).

4. The inventory, growth, and risk prediction using image processing system according to claim 1, where the image pre-processor is to pre-process the plurality of images for feature extraction from the plurality of images by at least one of removing shadows and highlight details from the plurality of images, or applying local adaptive histogram equalization to modify a local contrast of the plurality of images.

5. The inventory, growth, and risk prediction using image processing system according to claim 1, where the image pre-processor is to pre-process the plurality of images for feature extraction from the plurality of images by applying low pass filtering for noise removal from the plurality of images, and applying high pass filtering for identification of edges of the plurality of objects.

6. The inventory, growth, and risk prediction using image processing system according to claim 1, where the image pre-processor is to pre-process the plurality of images for feature extraction from the plurality of images by utilizing thresholding to create binary images of the plurality images by turning pixels below a predetermined threshold to a first value and pixels above another predetermined threshold to a second value, and applying morphological transformations on the binary images to refine boundaries of foreground objects.

7. The inventory, growth, and risk prediction using image processing system according to claim 1, where for the plurality of objects that include trees, and where the object level parameter generator is to determine the at least one parameter that includes a crown size of each of the plurality of trees based on convex hull analysis, and a location of each of the plurality of trees.

8. The inventory, growth, and risk prediction using image processing system according to claim 1, where the visual indication of density of distribution of the plurality of objects related to the portion of the at least one of the plurality of images includes a display of low density and high density areas related to the portion of the at least one of the plurality of images.

9. The inventory, growth, and risk prediction using image processing system according to claim 1, where for the plurality of objects that include trees, and where the visual indication of density of distribution of the plurality of trees related to the portion of the at least one of the plurality of images includes a display related to a height of the plurality of trees, where the height of the plurality of trees is determined based on a crown size of each of the plurality of trees.

10. The inventory, growth, and risk prediction using image processing system according to claim 1, where the alert corresponding to the plurality of objects related to the portion of the at least one of the plurality of images includes an indication of a low density area in the portion based on existence of the low density area for greater than a predetermined time period.

11. The inventory, growth, and risk prediction using image processing system according to claim 1, where for the plurality of objects that include trees, and where the partition level output generator is to use color segmentation to identify changes in chlorophyll levels of the plurality of trees, where the alert corresponding to the plurality of trees related to the portion of the at least one of the plurality of images includes an indication of possible pests based on changes in the chlorophyll levels of the plurality of trees.

12. A method for inventory, growth, and risk prediction using image processing, the method comprising:

receiving a plurality of images captured by a vehicle during movement of the vehicle along a vehicle path, where the plurality of images include a plurality of objects, and where the plurality of objects include at least one of trees or crops;

pre-processing, by a hardware processor, the plurality of images for feature extraction from the plurality of images;

extracting a plurality of features of the plurality of objects from the plurality of pre-processed images by using a combination of computer vision techniques;

determining at least one parameter related to the plurality of objects from the plurality of extracted features; and generating, based on the at least one determined parameter, the plurality of extracted features, historical data related to consumption of the plurality of objects at different ages of the plurality of objects, sand external effect data related to external effects on the plurality of objects, a risk prediction model to simulate effects of the historical data and the external effect data on the consumption of the plurality of objects.

13. The method according to claim 12, where for the plurality of objects that include trees, the historical data includes tree density at different ages and yield at harvest, and the external effect data includes at least one of weather or pest related effects on the plurality of trees, and where generating, based on the at least one determined parameter, the plurality of extracted features, the historical data, and the external effect data, the risk prediction model to simulate effects of the historical data and the external effect data on the consumption of the plurality of trees further comprises:

generating, based on the at least one determined parameter, the plurality of extracted features, the historical data, and the external effect data, the risk prediction model to simulate yield and loss related to the plurality of trees.

14. A non-transitory computer readable medium having stored thereon machine readable instructions for inventory, growth, and risk prediction using image processing, the machine readable instructions when executed cause at least one hardware processor to:
receive a plurality of images captured by a vehicle during movement of the vehicle along a vehicle path, where the plurality of images include a plurality of objects, and where the plurality of objects include at least one of trees or crops;
pre-process the plurality of images for feature extraction from the plurality of images;
extract a plurality of features of the plurality of objects from the plurality of pre-processed images by using a combination of computer vision techniques;
determine at least one parameter related to the plurality of objects from the plurality of extracted features;
generate, based on the at least one determined parameter and the plurality of extracted features, a spatial density model to provide at least one of
a visual indication of density of distribution of the plurality of objects related to a portion of at least one of the plurality of images, or
an alert corresponding to the plurality of objects related to the portion of the at least one of the plurality of images; and
generate, based on the at least one determined parameter, the plurality of extracted features, historical data related to consumption of the plurality of objects at different ages of the plurality of objects, and external effect data related to external effects on the plurality of objects, a risk prediction model to simulate effects of the historical data and the external effect data on the consumption of the plurality of objects.

15. The non-transitory computer readable medium according to claim 14, where the at least one parameter related to the plurality of objects includes at least one location related to the plurality of objects, the machine readable instructions when executed further cause the at least one hardware processor to:
utilize information related to a previous image to increase an accuracy of the at least one location related to the plurality of objects.

16. The non-transitory computer readable medium according to claim 14, where the machine readable instructions to extract the plurality of features of the plurality of objects from the plurality of pre-processed images by using the combination of computer vision techniques, further comprise machine readable instructions when executed further cause the at least one hardware processor to:
use a machine learning technique to determine the combination of computer vision techniques to identify a function that separates individual objects.

17. An inventory, growth, and risk prediction using image processing system comprising:
an image pre-processor, executed by at least one hardware processor, to
receive a plurality of images captured by a vehicle during movement of the vehicle along a vehicle path, where the plurality of images include a plurality of objects, and where the plurality of objects include at least one of trees or crops, and
pre-process the plurality of images for feature extraction from the plurality of images;
a feature extractor, executed by the at least one hardware processor, to extract a plurality of features of the plurality of objects from the plurality of pre-processed images by using a combination of computer vision techniques;
an object level parameter generator, executed by the at least one hardware processor, to determine at least one parameter related to the plurality of objects from the plurality of extracted features; and
a partition level output generator, executed by the at least one hardware processor, to
generate, based on the at least one determined parameter and the plurality of extracted features, a spatial density model to provide at least one of
a visual indication of density of distribution of the plurality of objects related to a portion of at least one of the plurality of images, and
an alert corresponding to the plurality of objects related to the portion of the at least one of the plurality of images, and
for the plurality of objects that include trees, use color segmentation to identify changes in chlorophyll levels of the plurality of trees, where the alert corresponding to the plurality of trees related to the portion of the at least one of the plurality of images includes an indication of possible pests based on changes in the chlorophyll levels of the plurality of trees.

* * * * *